United States Patent
Munro

(10) Patent No.: US 10,558,024 B2
(45) Date of Patent: *Feb. 11, 2020

(54) OPTICAL IMAGING ASSEMBLY AND SYSTEM WITH OPTICAL DISTORTION CORRECTION

(71) Applicants: BAXTER INTERNATIONAL INC., Deerfield, IL (US); BAXTER HEALTHCARE S.A., Glattpark (Opfikon) (CH)

(72) Inventor: James F. Munro, Ontario, NY (US)

(73) Assignees: BAXTER INTERNATIONAL INC., Deerfield, IL (US); BAXTER HEALTHCARE SA, Glattpark (Opfikon) (CH)

(*) Notice: Subject to any disclaimer, the term of this patent is extended or adjusted under 35 U.S.C. 154(b) by 196 days.

This patent is subject to a terminal disclaimer.

(21) Appl. No.: 15/704,931

(22) Filed: Sep. 14, 2017

(65) Prior Publication Data

US 2018/0003930 A1  Jan. 4, 2018

Related U.S. Application Data

(63) Continuation of application No. 15/133,486, filed on Apr. 20, 2016, now Pat. No. 9,791,676, which is a (Continued)

(51) Int. Cl.
*G02B 13/22* (2006.01)
*G02B 13/08* (2006.01)
(Continued)

(52) U.S. Cl.
CPC ............ *G02B 13/22* (2013.01); *G02B 13/08* (2013.01); *G02B 13/18* (2013.01);
(Continued)

(58) Field of Classification Search
CPC .... G02B 13/22; G02B 13/18; G02B 27/0025; G02B 13/08; G02B 3/06; G02B 13/24;
(Continued)

(56) References Cited

U.S. PATENT DOCUMENTS 3,871,748 A  3/1975  Day
4,912,529 A *  3/1990  Allen ................... G01N 21/255
356/237.1
(Continued)

FOREIGN PATENT DOCUMENTS

DE  3643276 A1  6/1988
JP  A-S49-10034  8/1972
(Continued)

OTHER PUBLICATIONS

Anon., "Beam Shaping with Cylindrical Lenses", Newport Corporation, Published Jan. 4, 2014. <http://www.newport.com/Beam-Shaping-with-Cylindrical-Lenses/144888/1033/content.aspx>.
(Continued)

*Primary Examiner* — Alicia M Harrington
(74) *Attorney, Agent, or Firm* — Greer, Burns & Crain, Ltd.

(57) ABSTRACT

An optical imaging assembly is provided, having an optical axis; an object axis defined by an object being imaged; an aperture stop disposed on the optical axis; a light-transmissive sleeve enclosing the object axis, being disposed in object space defined by the object axis; and at least three refractive lens elements being arranged between the object and the aperture stop without any other intervening optical component, at least one of the elements having surfaces having at least one of cylindrical and acylindrical prescription, with an image plane, wherein the object being imaged lies within the sleeve.

15 Claims, 12 Drawing Sheets

Related U.S. Application Data continuation of application No. 14/169,633, filed on Jan. 31, 2014, now Pat. No. 9,360,658.

(51) Int. Cl.
   *G02B 13/18*    (2006.01)
   *G02B 27/00*    (2006.01)
   *G02B 13/24*    (2006.01)
   *G02B 3/06*     (2006.01)

(52) U.S. Cl.
   CPC ............ *G02B 27/0025* (2013.01); *G02B 3/06* (2013.01); *G02B 13/24* (2013.01)

(58) Field of Classification Search
   CPC .............. A61M 1/1694; A61M 1/341; A61M 2205/3334; A61M 1/308; A61M 5/16886; A61M 1/1647; A61M 5/1411; A61M 5/16877; A61M 5/1689
   See application file for complete search history.

(56) References Cited

U.S. PATENT DOCUMENTS

| | | |
|---|---|---|
| 5,317,405 A | 5/1994 | Kuriki et al. |
| 5,588,963 A | 12/1996 | Roelofs |
| 5,900,993 A | 5/1999 | Betensky |
| 8,622,979 B2 | 1/2014 | Hungerford et al. |
| 9,360,658 B2 * | 6/2016 | Munro .................... G02B 13/08 |
| 9,791,676 B2 * | 10/2017 | Munro .................... G02B 13/22 |
| 2003/0107819 A1 | 6/2003 | Lin et al. |
| 2010/0204650 A1 | 8/2010 | Hungerford et al. |
| 2013/0201471 A1 | 8/2013 | Bui et al. |
| 2013/0201482 A1 | 8/2013 | Munro et al. |
| 2014/0043469 A1 | 2/2014 | Engel et al. |

FOREIGN PATENT DOCUMENTS

| | | |
|---|---|---|
| JP | H04280582 A | 10/1992 |
| JP | 07500669 A | 1/1995 |
| JP | 2001527658 | 12/2001 |

OTHER PUBLICATIONS

Singaporean Written Opinion from Singaporean Patent Application No. 11201606242V, dated Sep. 20, 2017.

Substantive report received in corresponding Chilean application, dated Sep. 24, 2018.

Notification of Reasons for Refusal in corresponding Japanese application, dated Oct. 16, 2018.

* cited by examiner

```
GENERAL LENS DATA:
Surfaces                        :           13
Stop                            :           10
System Aperture                 : Float By Stop Size = 7.5
Glass Catalogs                  : SCHOTT GEL MISC OHARA PLASTICS
Ray Aiming                      : Real Reference, Cache On
Effective Focal Length          :      116.6152
Effective Focal Length          :      116.6152 (in image space)
Back Focal Length               :      -42.29727
Total Track                     :      108.1264
Image Space F/#                 :      0.1659039
Paraxial Working F/#            :      1.362284
Working F/#                     :      1.405951
Image Space NA                  :      0.3442676
Object Space NA                 :      0.1894449
Stop Radius                     :           7.5
Paraxial Image Height           :      4.630334
Paraxial Magnification          :     -0.5261743
Entrance Pupil Diameter         :      702.908
Entrance Pupil Position         :      1820.583
Exit Pupil Diameter             :      51.2326
Exit Pupil Position             :     -69.79702
Field Type                      : Object height in Millimeters
Maximum Radial Field            :           8.8
Primary Wavelength              :      0.825 µm
Lens Units                      : Millimeters
Angular Magnification           :      13.71995

Fields              : 6
Field Type: Object height in Millimeters
#     X-Value      Y-Value      Weight
1     0.000000     0.000000     1.000000
2     4.000000     0.000000     1.000000
3     0.000000     3.000000     1.000000
4     0.000000     5.500000     1.000000
5     8.800000     0.000000     1.000000
6     6.000000     3.500000     1.000000

Wavelengths         : 1
Units: µm
#        Value        Weight
1      0.825000     1.000000
```

Figure 7A

```
SURFACE DATA SUMMARY:

Surf      Type        Radius    Thickness    Glass          Diameter
OBJ  STANDARD         Inf        1                             0
 1   STANDARD         Inf        5.8          17.6             0
 2   TOROIDAL         -6.8       1            20              50
 3   TOROIDAL         -7.8       2            FIT_SIGMA_PVC   50
 4   EVENASPH         Inf        4.5          POLYSTYR        20.33
 5   TOROIDAL         Inf        1                            21.15
 6   EVENASPH         Inf        2.5          POLYSTYR        22
 7   TOROIDAL         Inf        9.96                         22
 8   EVENASPH         Inf        5.04         POLYSTYR        25.46
 9   EVENASPH         Inf        37                           24.96
STO  STANDARD         Inf        12                           15
11   EVENASPH         Inf        8.32         POLYSTYR        25.04
12   EVENASPH         Inf        19                           24.61
IMA  STANDARD         Inf                                      7.2

SURFACE DATA DETAIL:

Surface OBJ   : STANDARD
Surface  1    : STANDARD
Surface  2    : TOROIDAL
  Aperture    : Rectangular Aperture
  X Half Width:   25
  Y Half Width:   16.8
Surface  3    : TOROIDAL
  Aperture    : Rectangular Aperture
  X Half Width:   25
  Y Half Width:   17.8
Surface  4    : EVENASPH
  Aperture    : Rectangular Aperture
  X Half Width:   15
  Y Half Width:   11
Surface  5    : TOROIDAL
  Rad of rev. :    0
  Coeff on y^2:   -0.025549442
  Coeff on y^4:   -6.1952869e-005
  Coeff on y^6:   -8.3959153e-008
  Coeff on y^8:    0
  Aperture    : Rectangular Aperture
  X Half Width:   15
  Y Half Width:   11
```

Figure 7B

```
Surface      6       : EVENASPH
Aperture             : Rectangular Aperture
X Half Width         : 15
Y Half Width         : 11
Surface      7       : TOROIDAL
Rad of rev.          : 0
Coeff on y^2         : 0.022060242
Coeff on y^4         : 3.3507273e-005
Coeff on y^6         : -1.4393092e-007
Coeff on y^8         : 0
Aperture             : Rectangular Aperture
X Half Width         : 15
Y Half Width         : 11
Surface      8       : EVENASPH
Coeff on r   2       : 0.0139908301
Coeff on r   4       : -6.1521188e-005
Coeff on r   6       : 4.1022487e-007
Coeff on r   8       : 0
Surface      9       : EVENASPH
Coeff on r   2       : -0.0085349991
Coeff on r   4       : -6.5122115e-005
Coeff on r   6       : 5.0103619e-007
Coeff on r   8       : 0
Surface    STO       : STANDARD
Aperture             : Circular Aperture
Minimum Radius       : 0
Maximum Radius       : 7.5
Surface     11       : EVENASPH
Coeff on r   2       : 0.03290815
Coeff on r   4       : -1.0138139e-005
Coeff on r   6       : 5.4218e-008
Coeff on r   8       : 0
Surface     12       : EVENASPH
Coeff on r   2       : -0.014651772
Coeff on r   4       : 2.3845993e-005
Coeff on r   6       : -1.3419746e-008
Coeff on r   8       : 0
Surface    IMA       : STANDARD
```

Figure 7C

OPTICAL IMAGING ASSEMBLY AND SYSTEM WITH OPTICAL DISTORTION CORRECTION

CROSS-REFERENCE

The present application is a Continuation application of U.S. patent application Ser. No. 15/133,486 filed Apr. 20, 2016, which is also a Continuation application of U.S. patent application Ser. No. 14/169,633 filed Jan. 31, 2014, now U.S. Pat. No. 9,360,658, which is incorporated herein by reference.

TECHNICAL FIELD

The present disclosure relates generally to optical imaging and measuring systems, and more specifically to such a system used for calibrating fluid flow to a medical infusion pump.

BACKGROUND

One way to measure the rate of flow of a fluid is to cause the fluid flow to be in a continuous stream of drops of known volume, and then count the number of droplets per unit time to deduce the flow rate. This approach is very coarse because it has a measurement granularity equal to the volume of the droplets, and it assumes that the volume of each droplet is the same as it detaches from its orifice. Indeed, this "drop counting" approach has measurement accuracy that is inadequate for many applications, such as medical infusion. The granularity problem can be eliminated if the volume of the droplets can be measured in real-time as the droplets form and detach from the supporting orifice.

One way to measure the volume is to capture a two-dimensional image of a pendant drop suspended from its orifice, and then measure its width along several points from the tip of the droplet to the orifice. If rotational symmetry is assumed, the droplet can be represented as a series of stacked disks where the volume of each disk is $V=\pi H (Width/2)^2$, where H is the distance between points along the axis of rotation. The volume of the drop is the sum of the volume of all the disks. To obtain good droplet volume accuracy, it is important to obtain good estimates of the width of the droplet. The rate of fluid flow can then be more accurately determined by measuring the time rate of change of droplet volume, by for example, collecting and processing a series of images in quick succession, such as a series of video images.

Complicating the imaging process is the fact that the pendant drop of an infusion tube is enclosed in a generally cylindrical drip chamber that introduces enormous amounts of optical distortion in the direction that the width of the droplet is to be measured. Further complicating matters is that splashes and condensation can cause fluid droplets to form on the inner surface of the drip chamber that can occlude or partially occlude the edge of the droplet from the image. Lastly, due to manufacturing, assembly, and even usage processes, the imaging assembly must be able to tolerate changes in distance between the axis of the pendant droplet and the lens without causing an appreciable change in the calculated volume of the droplet.

SUMMARY

Accordingly, an optical imaging assembly is prescribed that is optically fast, corrects for optical distortion introduced by a sleeve co-axial with an axis of the object, and is telecentric in object space. The present assembly employs combinations of cylindrical or acylindrical, and spherical or aspherical lens elements to correct optical distortion and other aberrations. In addition, the present disclosure relates to an optical imaging assembly for use with an infusion tube, or, more particularly, for imaging the pendant drop within an infusion tube. The present optical imaging assembly corrects for the optical distortion caused by the infusion tube, is optically fast so that droplets and other artifacts residing on the wall of the infusion tube are out of focus and not imaged by the imaging system, and is telecentric so the magnification of the object is substantially independent of the distance between the object and the first lens element.

According to aspects illustrated herein, there is provided an optical imaging assembly, including: an optical axis connecting an object plane and an image plane; an object axis within the object plane and perpendicular to the optical axis; a first optical element with a substantially planar input surface and acylindrical output surface where the axis of acylindricity intersects the optical axis and is parallel to the object axis; a second optical element with a substantially planar input surface and acylindrical output surface where the axis of acylindricity intersects the optical axis and is parallel to the object axis and the acylindrical output surface of the second optical element is spaced away from the acylindrical output surface of the first optical element; a third optical element with input and output surfaces having rotational symmetry and centered on the optical axis; an aperture stop; and a fourth optical element with input and output surfaces having rotational symmetry and centered on the optical axis.

More specifically, an optical imaging assembly is provided, including an optical axis, with an object axis, having a light-transmissive sleeve enclosing the object axis, telecentric in object space, having at least three refractive lens elements, in two of the lens elements, at least one of the elements having surfaces with at least one of cylindrical and acylindrical prescription, with an image plane, wherein the object being imaged lies within the sleeve.

In one embodiment, an assembly includes four lens elements arranged in a manner such that the resulting optical imaging assembly is able to correct for large amounts of optical distortion, is telecentric in object space, has an f-number of 1.5 or less. Two of the lens elements have aspherical prescriptions, and the other two lens elements have acylindrical surfaces, wherein the two acylindrical surfaces are separated from one another. The optical imaging assembly is well adapted for use in a liquid flowmeter system in which the fluid flows in a series of droplets enclosed in a drip chamber.

In another embodiment, an imaging assembly is configured for removing optical distortion from an image generated by an object located within a light transmissive sleeve. The assembly includes a first optical element acting in conjunction with a second optical element; both optical elements have cylindrical and/or acylindrical surfaces that together remove optical distortion from the image.

In yet another embodiment, an optical imaging assembly is provided, having an optical axis; an object axis defined by an object being imaged; an aperture stop disposed on the optical axis; a light-transmissive sleeve enclosing the object axis, being disposed in object space defined by the object axis; and at least three refractive lens elements being arranged between the object and the aperture stop without any other intervening optical component, at least one of the elements having surfaces having at least one of cylindrical and acylindrical prescription, with an image plane, wherein the object being imaged lies within the sleeve.

In yet another embodiment, an imaging assembly is provided, having an optical axis; an object axis defined by an object being imaged; an aperture stop disposed on the optical axis; four lens elements disposed on the optical axis, at least three of the four lens elements being arranged between the object and the aperture stop without any other intervening optical component; and a light-transmissive sleeve being disposed in object space defined by the object axis. The imaging assembly has an optical speed f-number of 1.5 or less, two of the four lens elements have aspherical prescriptions, and the other two of the four lens elements have acylindrical surfaces, and the two acylindrical surfaces are separated from one another.

BRIEF DESCRIPTION OF THE DRAWINGS

The nature and mode of operation of the present optical imaging assembly will now be more fully described in the following detailed description taken with the accompanying drawing figures, in which:

FIGS. 7A, 7B, and 7C, are a prescription of an embodiment of the present optical imaging assembly, created by the Zemax lens design program;

DETAILED DESCRIPTION

At the outset, it should be appreciated that like drawing numbers on different views identify identical, or functionally similar, elements of the present disclosure.

Furthermore, it is understood that the present disclosure is not limited to the particular methodology, materials, and modifications as described, and any of these may, of course, vary. It is also understood that the terminology used herein is for the purpose of describing particular aspects only, and is not intended to limit the scope of the present disclosure, which is limited only by the appended claims.

Unless defined otherwise, all technical and scientific terms used herein have the same meaning as commonly understood to one of ordinary skill in the art to which the present disclosure belongs. Although any methods, devices, or materials similar or equivalent to those described herein can be used in the practice or testing of the present disclosure, example methods, devices, and, materials are now described.

Figure 1:
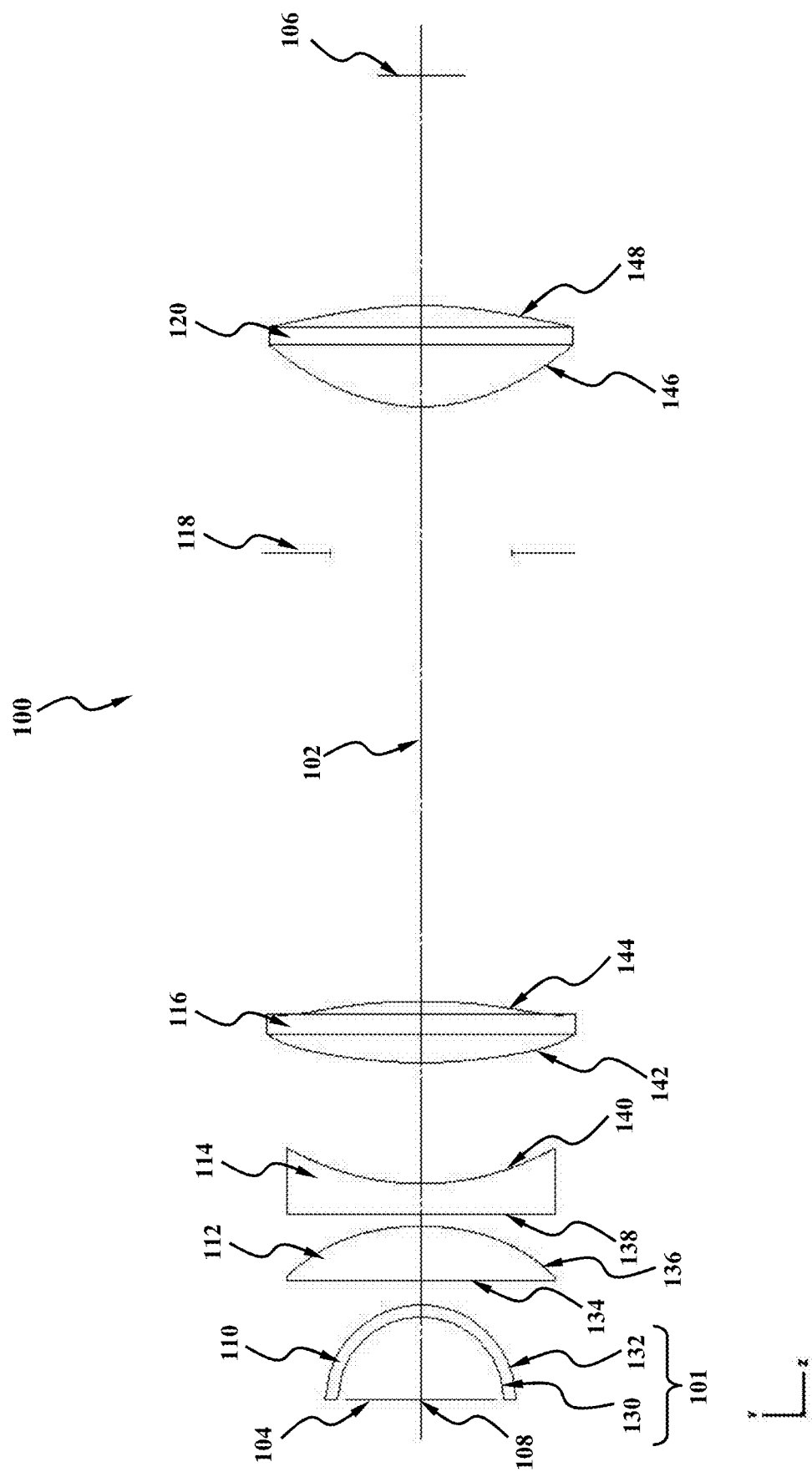
FIG. 1 is a schematic top-view of the present optical imaging assembly.

FIG. 1 is a schematic top-view of optical imaging assembly 100, which includes an optical axis 102, a first lens element 112 having an input surface 134 and an output surface 136, a second lens element 114 having an input surface 138 and an output surface 140, a third lens element 116 having an input surface 142 and an output surface 144, an aperture stop 118, and a fourth lens element 120 having an input surface 146 and an output surface 148. The object plane 104 is perpendicular to the optical axis 102 and contains at least a portion of the object being imaged such as the pendant drop 152 shown in FIG. 3. Object space 101 also includes a sleeve 110 having an axis of rotation 108, the axis of rotation 108 also being substantially coincident with a rotationally symmetric object such as the pendant drop 152 shown in FIG. 3. The sleeve 110 is preferably substantially cylindrical, is contemplated as being slightly cone-shaped with a slope of approximately 0.5 to 5.0° for facilitating the molding process, and has an inner surface 130 and an outer surface 132. The image produced by the optical imaging assembly 100 lies in image plane 106.

Also shown in FIG. 1 is a key to the axes in which the Z-axis is taken to be the optical axis 102, the Y-axis is perpendicular to the Z-axis in the plane of the drawing, and the X-axis is perpendicular to the Z-axis and perpendicular to the plane of the drawing. The object plane 104 is in the X-Y plane at Z=0.

Each of the components listed above will be described more fully with reference to FIGS. 1, 2, and 3. The first lens element 112 is a refractive optical element having a substantially planar input surface 134 and a cylindrical or acylindrical output surface 136. Planar surfaces are less costly to produce than non-planar surfaces, and should be used whenever possible to reduce the manufacturing costs of the optical imaging assembly 100. Furthermore, making input surface 134 planar facilitates placement and replacement of the sleeve 110 in front of the optical imaging assembly 100 so that different objects can be installed in front of the optical imaging assembly 100 as needed. Output surface 136, being cylindrical or acylindrical, has optical power in the Y-axis direction and little or no optical power in the X-axis.

The second lens element 114 is a refractive optical element having a substantially planar input surface 138 and a cylindrical or acylindrical output surface 140. Planar surfaces are less costly to produce than non-planar surfaces, and should be used whenever possible to reduce the manufacturing costs of the optical imaging assembly 100. The output surface 140, being cylindrical or acylindrical, has optical power in the Y-axis direction and little or no optical power in the X-axis.

Figure 2:
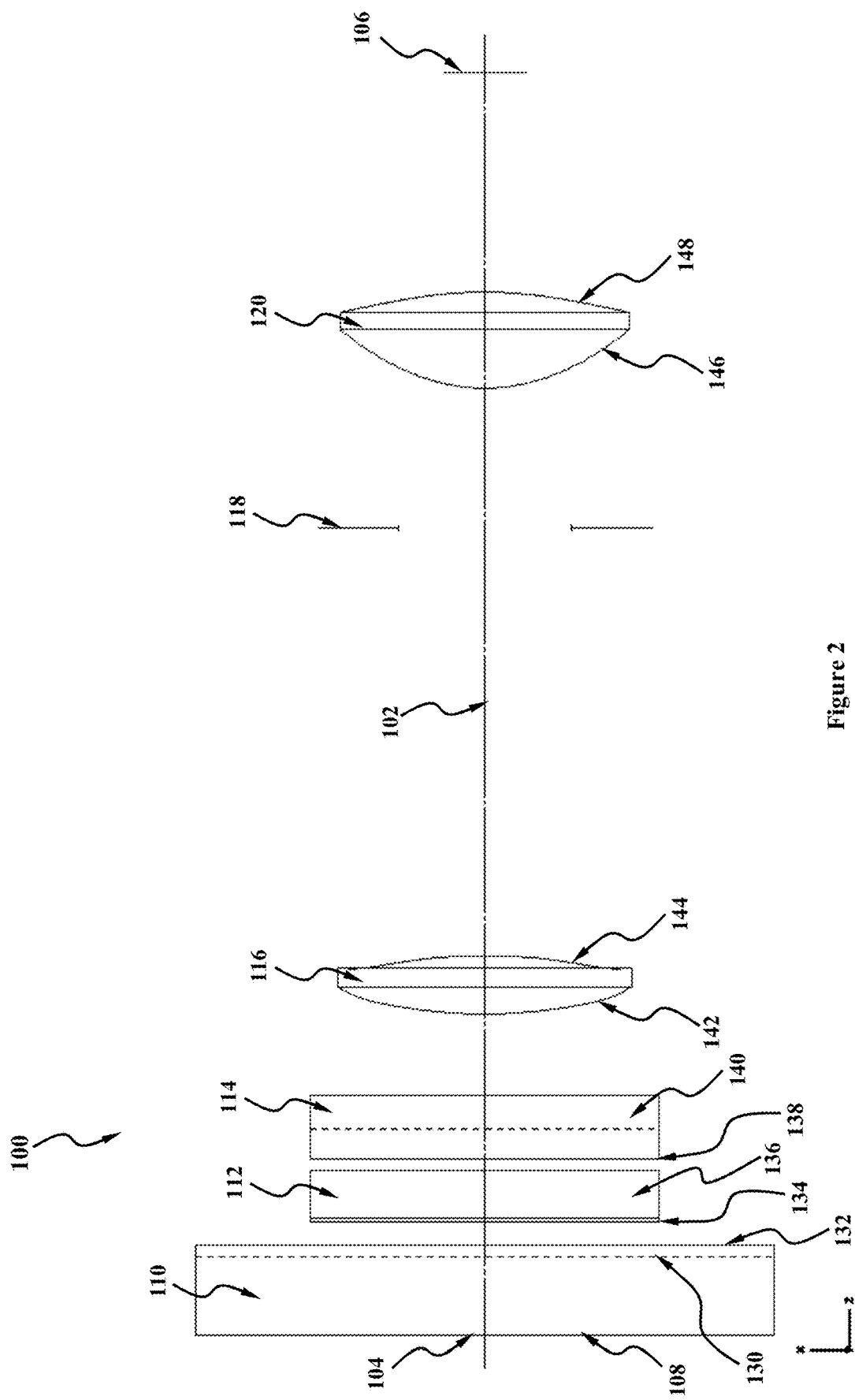
FIG. 2 is a schematic side-view of the present optical imaging assembly.
Figure 3:
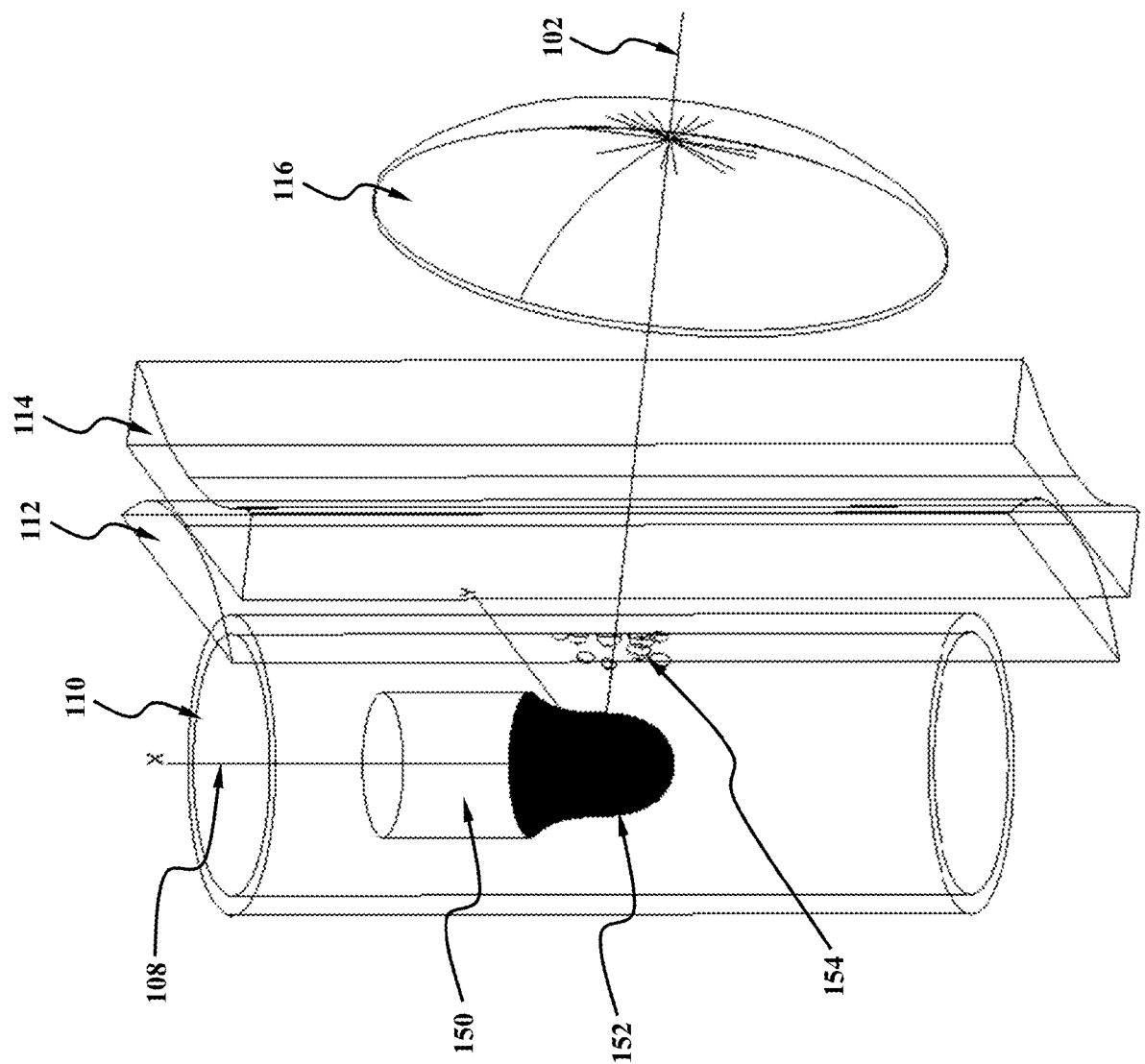
FIG. 3 is an isometric view of the object, the sleeve about the object, and objective lens elements of the present optical imaging assembly.

In FIGS. 1, 2, and 3, the cylindrical/acylindrical surfaces are shown to reside on the output surfaces, 136 and 140, although they could reside on the input surfaces, 134 and 138, or a combination of input and output surfaces such as input surfaces 134 and output surface 140 or output surface 136 and input surface 138.

In FIGS. 1, 2, and 3, both cylindrical/acylindrical surfaces have optical power in the Y-direction (i.e., perpendicular to the optical axis 102 and perpendicular to the object axis 108), although the optical power could instead be in the X-direction (i.e., the direction parallel to the object axis 108), or one cylindrical/acylindrical surface can have optical power in the Y-direction and the other cylindrical/acylindrical surface can have optical power in the X-direction.

The third lens element 116 is a refractive optical element having a spherical or aspherical input surface 142 whose center of rotation is substantially coincident with the optical axis 102. Similarly, the output surface 144 is spherical or aspherical and also has a center of rotation substantially coincident with the optical axis 102.

An aperture stop 118 is placed between the third lens element 116 and the fourth lens element 120. The aperture stop 118 can be fabricated from opaque thin sheet material, such as metal or plastic sheeting. The aperture of the aperture stop 118 is nominally round, but can have other shapes as well such as square, rectangular, hexagonal, octagonal, or any shape made from arbitrary lines segments and arcs. The aperture of the aperture stop 118 is nominally centered on the optical axis 102. A distance from one side to an opposing side of the aperture of the aperture stop 118 can be between 1 mm and 100 mm when measured through the optical axis 102.

All refractive lens elements 112, 114, 116, and 118 are contemplated as being made from glass or polymer such as acrylic, polycarbonate, or polystyrene, although in general materials having a higher refractive index such as polycarbonate or polystyrene provide for greater optical power, which in turn facilitates a more compact design in which the distance from the object plane 104 to the image plane 106 is reduced. If the choice of material is polymer, any or all of the lens elements 112, 114, 116, and 118 can be made from an injection molding process, compression molding process, injection-compression molding process, or even diamond turned. If the choice of material is glass, any or all of the lens elements 112, 114, 116, and 118 can be fabricated with a traditional glass grinding and polishing process, an advanced polishing process such as MRF (magneto-rheological finishing), a diamond turned process, or with a molding process.

The thicknesses of each of the refractive lens elements 112, 114, 116, and 118, as measured from the apex of the input surface to the apex of the output surface along the optical axis, can be from between 1.0 and 25.0 mm. The perimeter of the refractive elements 112, 114, 116, and 118 can be rectangular, such as shown, for example, for first lens element 112 in FIG. 3, or circular such as shown, for example, for third lens element 116 in FIG. 3, or they can have any number of arbitrary curves and sides to facilitate manufacturing. A distance from one side to an opposing side of any or all refractive lens elements 112, 114, 116, and 118, can be between 10 mm and 200 mm when measured through the optical axis 102.

If any or all of the refractive lens elements 112, 114, 116, and 118 are made with a molding process, then mounting, alignment, or attachment features can be incorporated into the lens element during the fabrication process.

Due to Fresnel reflection, each surface of the refractive lens elements 112, 114, 116, and 118 will back-reflect approximately 4% of the light incident upon it, resulting in diminished light throughput and stray light that can form glints or other artifacts in the image that can corrupt the image processing process. An antireflective coating can be installed onto some or all of the surfaces of the refractive lens elements 112, 114, 116, and 118 to reduce the Fresnel surface reflectance to less 1%. The antireflective coating can be a broad-band antireflective coating, or it can be a multi-layer interference film stack.

Furthermore, the coating on the input surface 134 of the first optical element 112 should have abrasion resistance properties because the drip chamber 300 will need to be replaced at the start of every infusion. Also, abrasion resistance is beneficial since the drip chamber is in close proximity to the input surface 134, which can be scratched or damaged when the drip chamber 300 is installed.

Surrounding the object plane 104 and the object 152 is the sleeve 110. In the preferred embodiment, the substantially cylindrical sleeve 110 is not part of the optical imaging assembly 100, but instead resides in the object space 101 and is used to enclose, encapsulate, or otherwise contain the object 152. The sleeve 110 is substantially transparent or translucent to the light being used to image the object 152, and can be made from a polymer such as acrylic, polycarbonate, polystyrene, or vinyl. The sleeve 110 can be part of an infusion administration set, such as that made by Baxter International, Inc. If the sleeve 110 is part of an infusion administration set, then the sleeve is known as a drip chamber, and the object 152 is a pendant drop residing within the drip chamber and centered or nearly centered on the optical axis 102. The sleeve drip chamber 110 is nominally centered on the object axis 108, and has an inner radius of 7.8 mm and an outer radius of 8.8 mm, although the sleeve drip chamber can have other radii in the range of 1.0 mm to 100 mm.

The sleeve drip chamber 110 introduces severe optical distortion along the Y-axis that must be compensated by the optical imaging assembly 100 for accurate measurement of the width of the object 152. That is, for best results, the image of the object 152 at the image plane 106 should be substantially free from optical distortion.

The sleeve drip chamber 110 is typically fabricated with a low-cost injection molding process. To reduce fabrication costs, the mold used can have surface imperfections that impart surface imperfections into the cylindrical sleeve that can appear in the image of the object 152. Furthermore, it is expected that the sleeve drip chamber 110 can have seam lines, flow lines, and particulate imperfections that can all appear in the image.

When fluids are flowing through the sleeve 110 in operation, i.e., when the object 152 droplets are forming and detaching inside the sleeve drip chamber, splashes from the fluid reservoir at the bottom of the sleeve drip chamber can settle on the inner surface 130 of the sleeve within the field of view of the optical imaging assembly 100. Furthermore, over long periods of time, the fluid flowing through the sleeve 110 can evaporate and subsequently condense on the inner surface 130 of the sleeve 110 within the field of view of the optical imaging assembly 100. This condensation can appear as a collection of closely-spaced droplets, and significantly impair the ability of a conventional imaging assembly to image the interior of the sleeve 110. Both the aforementioned splashes and condensation are shown in FIG. 3 as sidewall droplets 154.

Another challenge facing the optical imaging assembly 100 is the placement of the sleeve 110, or more particularly the location of the object axis 108 and object 152 relative to the optical imaging assembly 100. That is, due to instabilities and the flexibility of a vinyl sleeve drip chamber 110, the distance between the object axis 108 and the input surface 134 of the first lens element 112 can vary by several millimeters. This dimensional problem is exacerbated whenever one sleeve drip chamber 110 is replaced with another like component as typically occurs when one infusion ends and another begins. Since the magnification of a lens typically varies with varying object distance, the varying magnification will cause the image size to vary and the calculated volume of the pendant drop object 152 to be inaccurate, which will in turn cause the computed flow rate to be inaccurate as well.

The preceding paragraphs have illustrated the need for the optical imaging assembly 100 to have the following set of characteristics: 1) the optical imaging assembly 100 must be telecentric in object space so the magnification does not change with varying object-to-input surface distance; 2) the optical imaging assembly 100 must be optically fast, on the order of F/1.5 or faster, so that sidewall droplets 154 and other undesirable artifacts within the sleeve drip chamber 110 are out of focus and do not appear in the image; and 3) the optical distortion introduced by the sleeve 110 is removed by the optical imaging assembly 100. An additional desirable characteristic is that the optical imaging assembly 100 be as compact as possible, meaning, for example, that the distance between the object plane 104 and the image plane 106 is small, such as less than 150 mm. The present optical imaging assembly 100 has these four desirable features, whose functions are described in the following paragraphs.

Figure 4:
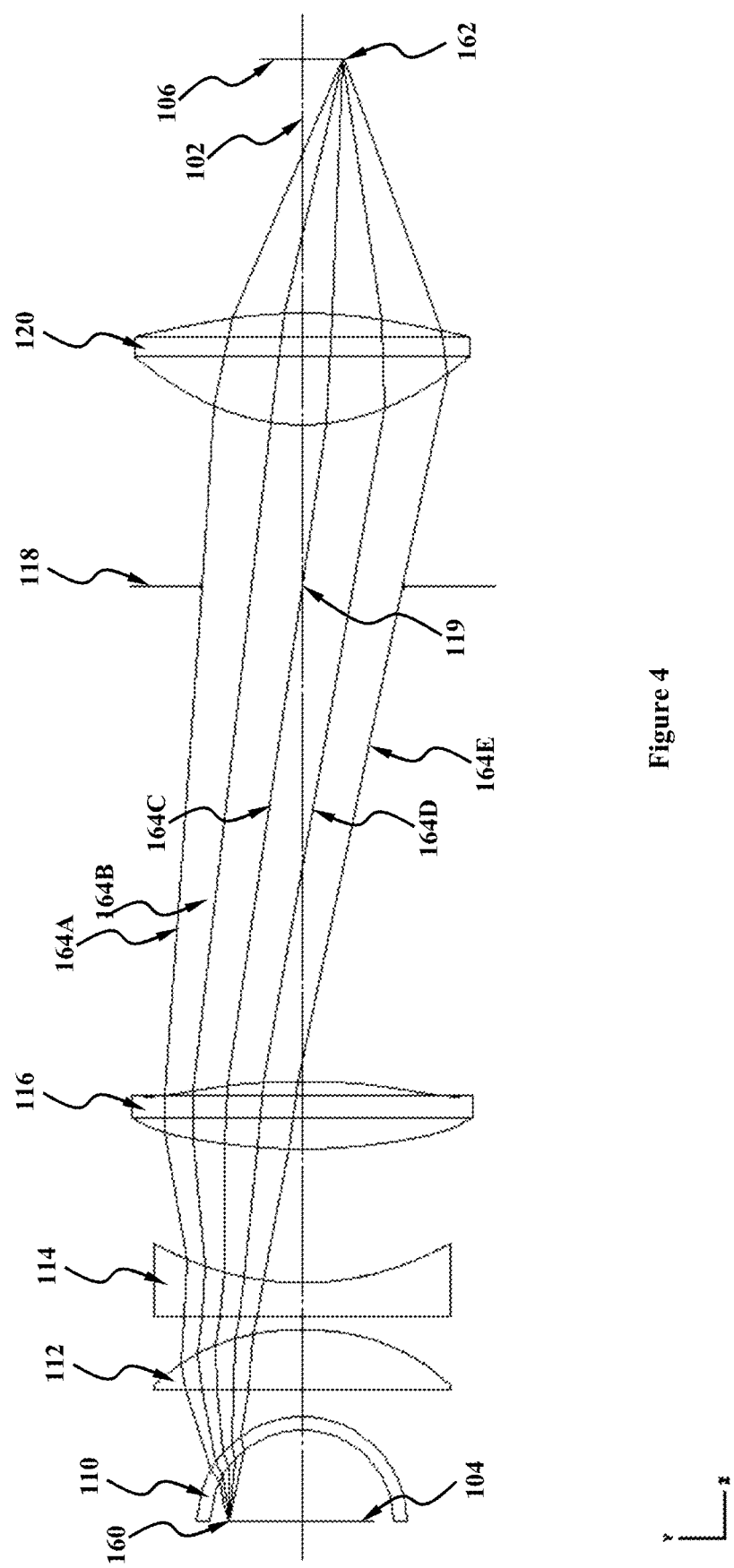
FIG. 4 is a top-view ray-trace plot showing how a fan of rays originating at the edge of the field in the object plane propagate through the optical imaging assembly to the image plane.

Telecentricity in object space 101 is that condition where the ray that leaves the object 152 propagating parallel to the optical axis 102 passes through the center of the aperture stop 118. In FIG. 4, that particular ray, also called the chief ray, is seen to be ray 164C, which leaves the object at location 160 in a direction substantially parallel to the optical axis 102, and subsequently passes through the aperture stop 118 at location 119. Note that the location 119 is substantially at the center of the aperture stop 118, and the chief ray 164C intersects the optical axis 102 at the location 119.

The object space telecentricity condition is determined by the optical power of the third lens element 116, and the optical distance between the third lens element 116 and the object plane 104, as well as the optical distance between the third lens element 116 and the aperture stop 118.

As described earlier, the drip chamber 110 introduces crippling amounts of optical distortion that are removed by the optical imaging assembly 100. This optical distortion compensation is achieved with the first optical element 112 acting in conjunction with the second optical element 114. Both of these optical elements have cylindrical and/or acylindrical surfaces (i.e., output lens surface 136 and output lens surface 140) that together remove the optical distortion from the image. Initial attempts at designing the distortion-compensation lens assembly utilized only one optical element having one or two cylindrical and/or acylindrical surfaces; intuitively this approach seemed reasonable since the sleeve 110 is only one optical component (external to the lens proper), and the distortion it introduces should be counteracted with only one lens element having a cylindrical or acylindrical surface. However, it was found that all designs that utilized only one element having a cylindrical or acylindrical surface could not be made optically fast and/or telecentric, or suffered from poor image quality.

In addition to requiring two lens elements for optical distortion correction (namely the first lens element 112 and the second lens element 114), the cylindrical/acylindrical surfaces of these two lens elements are preferably physically separated from one another by a considerable distance, such as 4 mm or more. This separation allows for the distortion-correction characteristics of one cylindrical/acylindrical surface to be leveraged against the second cylindrical/acylindrical surface. That is, because the two acylindrical/cylindrical surfaces (e.g., 136 and 140) are separated, their aberration-compensating effects are not simply additive, but instead interact producing higher-order distortion-compensation terms. This interaction is one of the key components of the present assembly 100.

The optical imaging assembly 100 is preferably optically fast, as noted earlier, so obscurations residing within the sleeve 110 drip chamber, or obscurations residing on either the inner surface 130 or outer surface 132, are out of focus and do not appear in the image. These obscurations do not appear in the image if the optical imaging assembly has an optical speed less than approximately F/2.0, or preferably less than F/1.5.

It is typically not difficult to design a lens having an f-number of 2.0 or less, although the design of such a lens does become difficult if the object or image field size is large, or if substantial aberrations are present and must be eliminated. Both of these conditions are present in the present operational environment, and the optical imaging assembly 100 preferably provides good image quality over the entire field at the requisite optical speed. This is accomplished with the third optical element 116 and the fourth optical element 120, both of which have input and output surfaces that have radially symmetric optical power. These four surfaces can be spherical in nature, although better image quality can be obtained if they are aspherical, such as an asphere described by an eighth-order polynomial, although lower order polynomials—such as sixth order—can be used as well.

The diameter of the aperture of the aperture stop 118 also plays a role in defining the optical speed of the optical imaging assembly 100. Generally speaking, the greater the width of the aperture the faster the lens, although a larger aperture generally allows more highly aberrated rays to reach the image resulting in poorer image quality.

To summarize, the first lens element 112 and the second lens element 114 are used to correct the optical distortion introduced by the sleeve 110; the third lens element 116 and the aperture stop 118 are used to control the object-space telecentricity of the optical imaging assembly 100, and the third lens element 116 and the fourth lens element 120 with the aperture stop 118 are used to provide good image quality with low f-number.

FIG. 3 shows one application of the optical imaging assembly 100 in which the fluid flow rate of an infusion administration set is measured. In such a setup, the object is the pendant drop 152 suspended from an orifice 150, both of which are substantially located on the object axis 108. During operation the pendant drop 152 grows in size as the infused fluid flows, then detaches from the orifice 150 when it reaches its terminal weight, and then grows and detaches repeatedly until the desired volume of fluid has been administered. Since the volume of the droplet is less than a milliliter, several thousand drops grow and detach over the course of an infusion.

During the course of an infusion, droplets 154 can form on the inner surface of the sleeve drip chamber 110. These droplets 154 can result from splashes from the falling droplet landing in the fluid reservoir at the bottom of the drip chamber. Since the course of an infusion can last several hours, fluid can evaporate from the pendant droplet 152 and from the reservoir of fluid at the bottom of the drip chamber. If the temperature of the inner surface 130 is low enough, then some of the evaporated fluid can condense on the inner surface 130 and present themselves as droplets 154.

Figure 5:
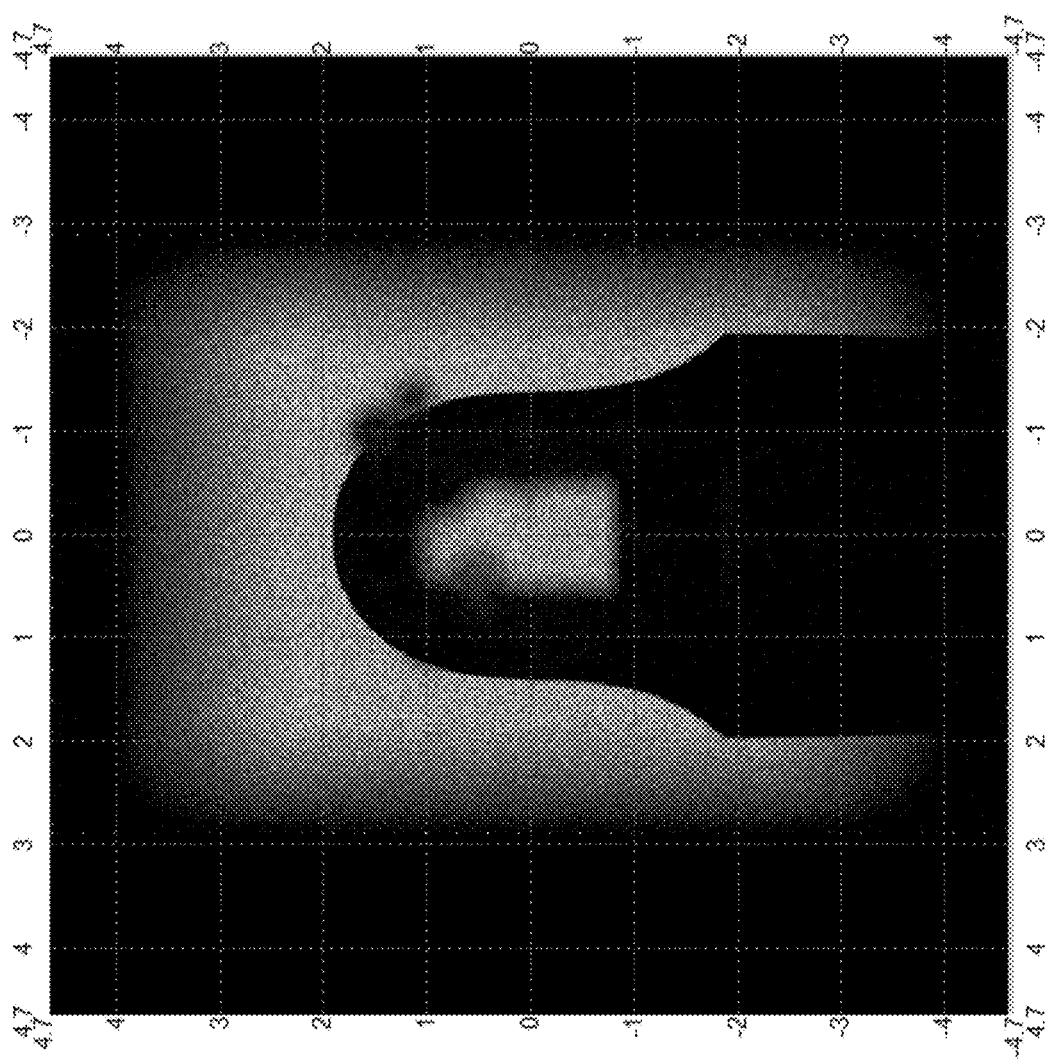
FIG. 5 is a representative image of a pendant drop within a sleeve having inner surface droplets in which the optical imaging assembly is not optically fast.

If the optical speed of the optical imaging assembly 100 is relatively low (i.e., high f-number), then the droplets 154 will be in focus, or partially in focus, at the image plane 106. For example, FIG. 5 shows an image of the pendant droplet 152 in the presence of inner surface 130 droplets 154 when the speed of the optical imaging assembly 100 is only f/5.6. Note that the images of the droplets 154 are easily discernible. Worse, some of the droplets 154 lie at the edge of the image of the pendant drop 152, which, to the image processing software, will make the size of the pendant drop 152 appear to be greater than it actually is, and will cause the fluid flow measurement calculations to produce inaccurate results.

Figure 6:
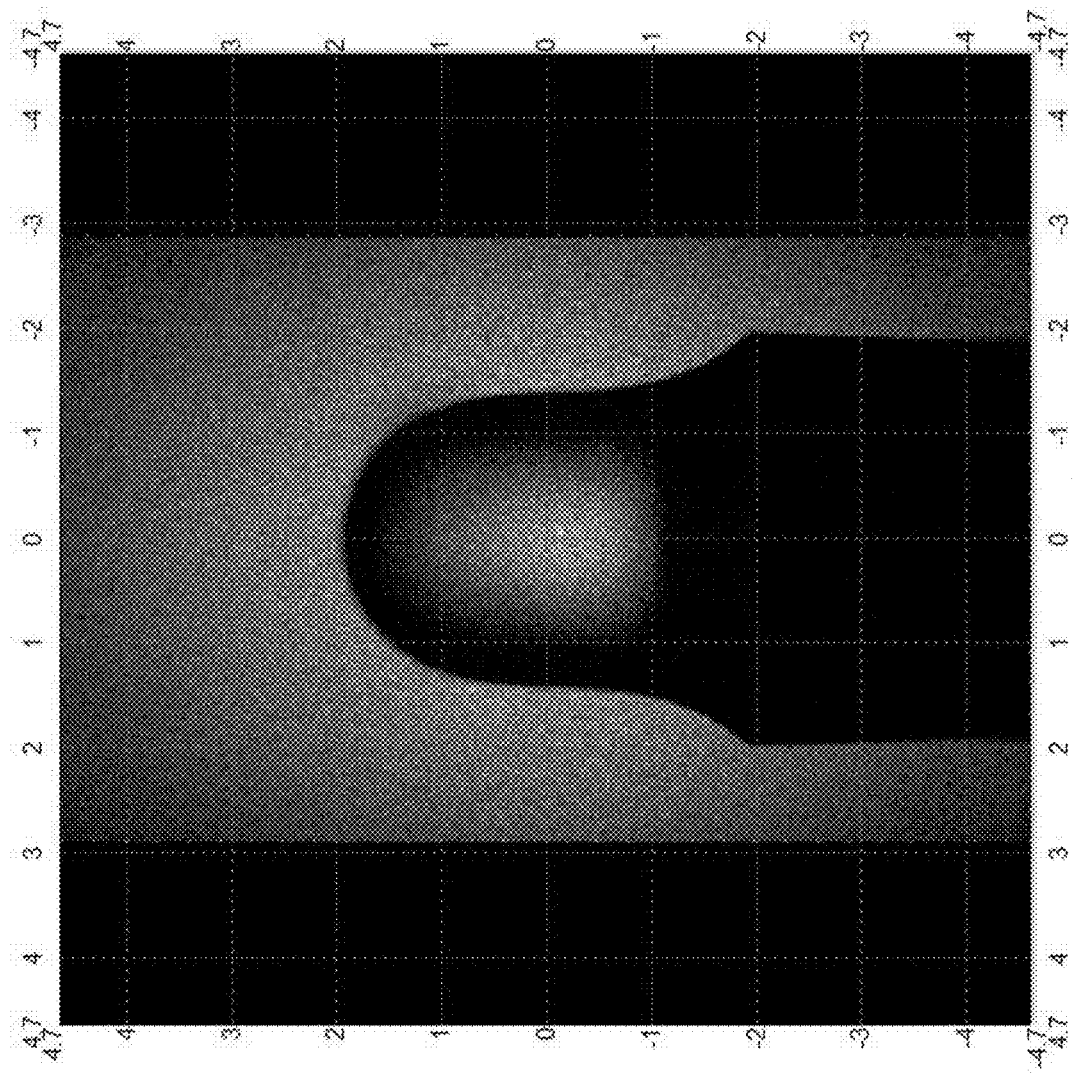
FIG. 6 is a representative image of a pendant drop within a sleeve having inner surface droplets in which the optical imaging assembly is optically fast.

FIG. 6 shows is an image of the pendant drop 152 with the same set of droplets 154 residing on the inner surface 130 as was made for the image of FIG. 5. However, the image of FIG. 6 was made with an optical imaging assembly 100 having an optical speed of f/1.4. Note that images of droplets 154 are barely noticeable and the edge of the image of the pendant drop 152 has good contrast and fidelity. The image processing software will be able to compute the size of the pendant drop 152 with good accuracy.

One such embodiment of the optical imaging assembly 100 was designed with Zemax (Radiant Zemax, LLC, Redmond Wash., USA). The prescription of the assembly is given in FIGS. 7A, 7B, and 7C. Highlights of the design shown in FIG. 7A include: a total track of 108.1 mm (the distance from the object plane 104 to the image plane 106), a stop radius of 7.5 mm, a working F/# of 1.40, a maximum object field width of 8.8 mm, a magnification of −0.526, and the wavelength of the light is 825 nm. The image quality was set to be optimized at six object field locations, being, in X,Y pairs in millimeters: (0.0, 0.0), (4.0, 0.0), (0.0, 3.0), (0.0, 5.5), (8.8, 0.0), and (6.0, 3.5).

In FIG. 7B it is seen that the optical model consists of an object "OBJ" plane and image "IMA" plane, an aperture stop "STO", and eleven other surfaces. Surface 1 is a dummy surface used by Zemax for telecentricity optimization. Surfaces 2 and 3 are the inner surface 130 and outer surface 132 of the transparent sleeve 110, which is made from PVC. Surfaces 4 and 5 are the input surface 134 and the output surface 136 of the first lens element 112, which is made from polystyrene (POLYSTYR). Surfaces 6 and 7 are the input surface 138 and the output surface 140 of the second lens element 114, which is also made from polystyrene. Surfaces 8 and 9 are the input surface 142 and the output surface 144 of the third lens element 116, which is also made from polystyrene. Lastly, surfaces 11 and 12 are the input surface 146 and the output surface 148 of the fourth lens element 120, which is made from polystyrene as well.

Further down in FIG. 7B, and in FIG. 7C, it is seen that the input surface 134 of the first lens element and the input surface 138 of the second lens element both have no curvature and are in fact planar. Output surface 136 of the first lens element and the output surface 140 of the second lens element both have acylindrical prescriptions. Both surfaces of the third lens element 116 and the fourth lens element 120 are aspherical.

Figure 8B:
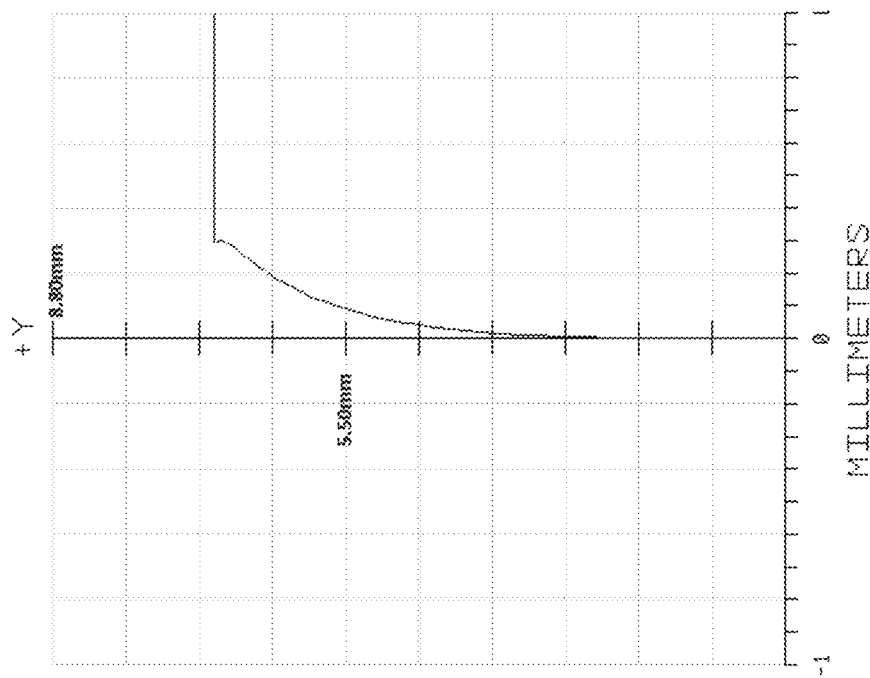
FIGS. 8A and 8B are graphs from the Zemax lens design program illustrating the amount of optical distortion of the optical imaging assembly in the directions parallel to the object axis and perpendicular to the object axis, respectively, with a cylindrical sleeve located about the object.
Figure 8A:
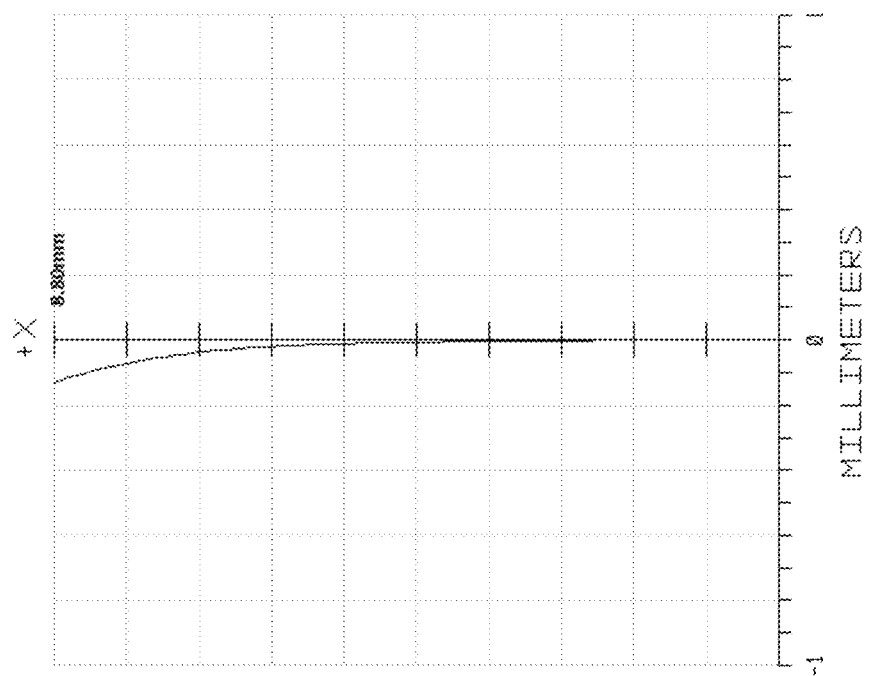

FIGS. 8A and 8B are plots of optical distortion present in the image in the X direction (parallel to the object axis 108) and the Y direction (perpendicular to the object axis 108). In the X direction, the distortion is only a few tens of microns out to a field distance of about 5 mm. In the Y direction, the distortion is only a few tens of microns out to a radial field distance of about 4 mm. Note that in the Y direction, the distortion is undefined at radial field distances greater than the radius of the inner surface 130 of the sleeve 110.

Figure 9:
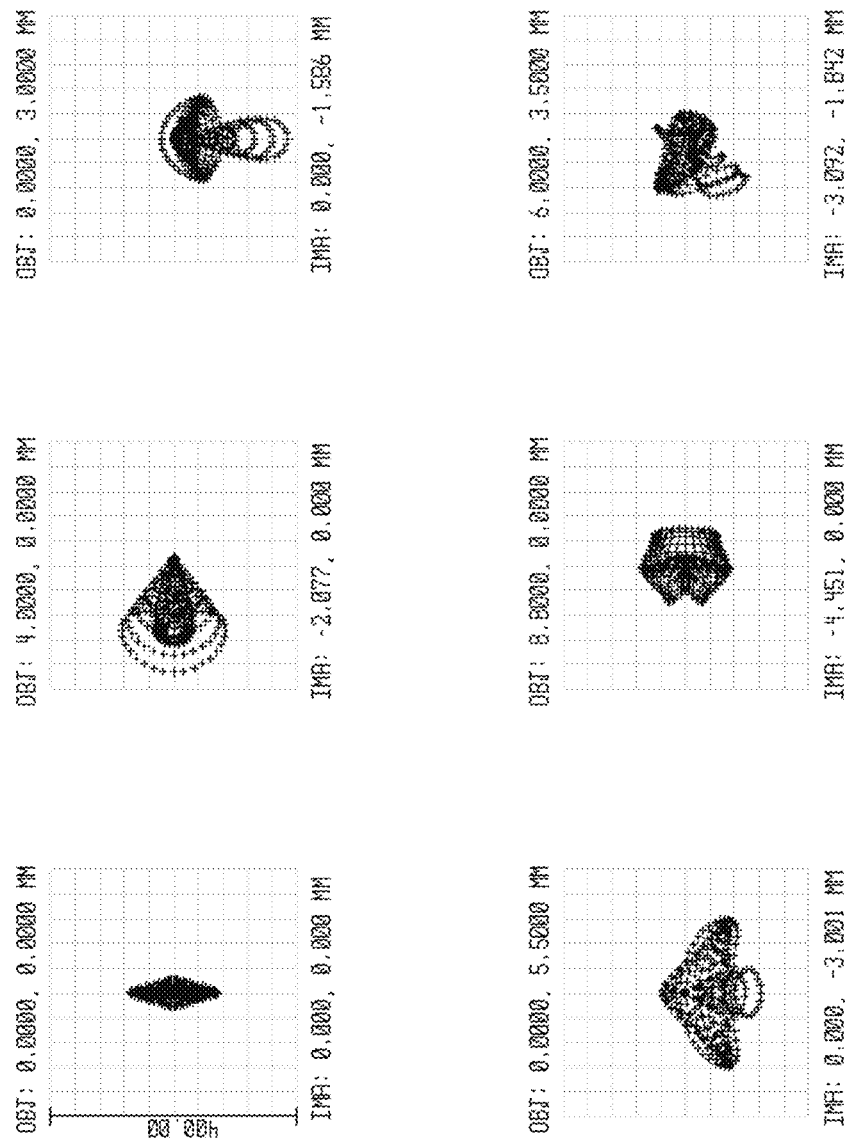
FIG. 9 are spot diagrams from the Zemax lens design program showing the size and shape of the images produced by the present optical imaging assembly in which the object consists of delta-functions at six field locations with a sleeve located about the object.

FIG. 9 is a collection of image spot diagrams for the six object field locations noted earlier, and optimized by Zemax. Note the scale is 400 um, which is the height and width of each of the six graphs. The RMS width of each of the six spots is substantially less than 100 um. Since a pixel of a CCD or CMOS image sensor is typically 10 um or less, the edges of the pendant drop 152 object will be imaged across about ten pixels, which is ideal for localizing the edge of the image of the object with sub-pixel accuracy with advanced image-processing algorithms.

Figure 10:
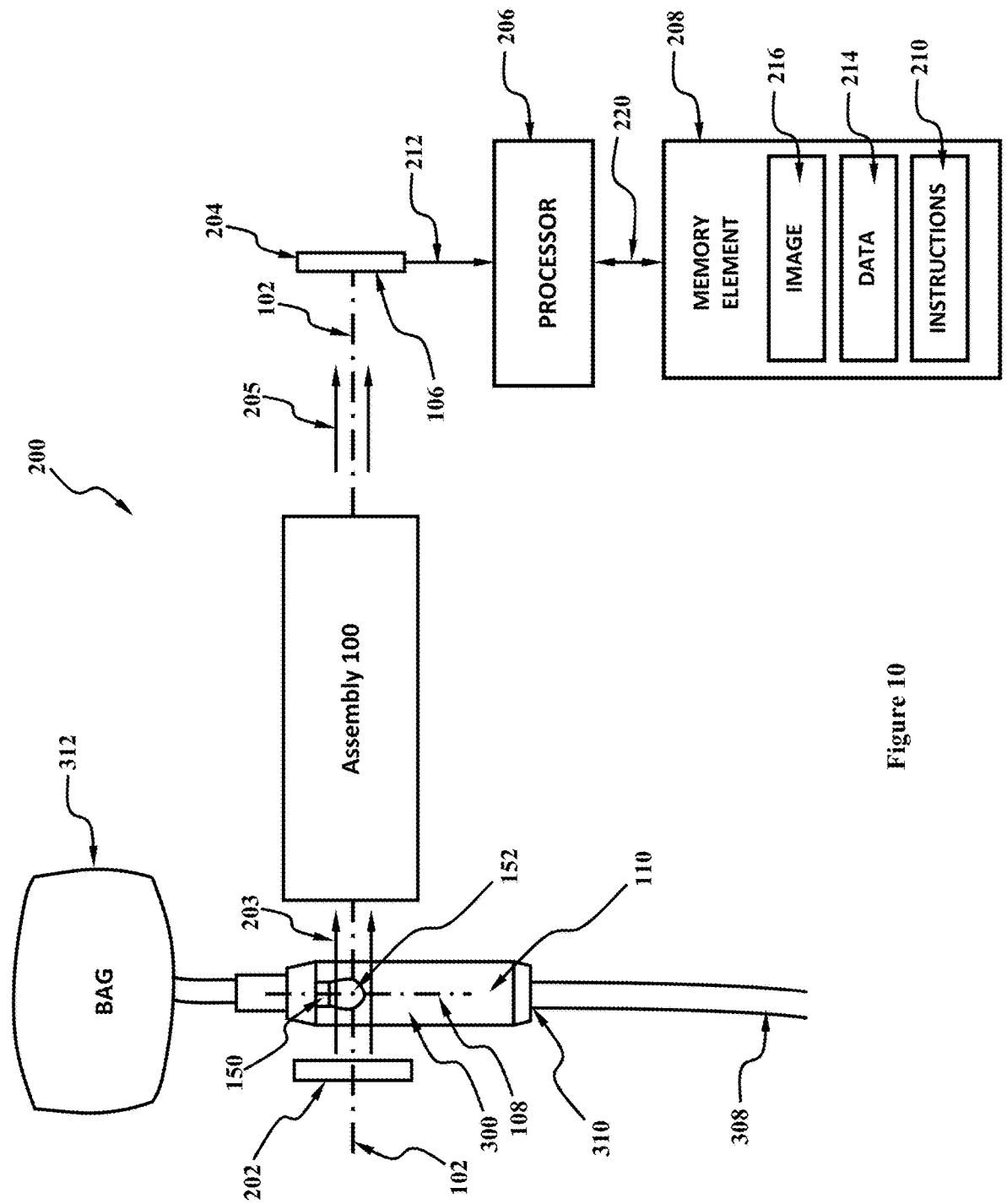
FIG. 10 is a block diagram illustrating how the present optical imaging assembly is used in a flow-rate measurement system.

FIG. 10 shows how the present optical imaging assembly 100 can be used as part of a flowmeter 200 of a medical infusion device to measure the rate of flow of the infused fluid. The flowmeter includes a bag 312 or container of fluid that is to be infused, a pendant drop 152 of infusion fluid whose rate of flow is to be measured, a drip chamber 300 with exit port 310 and an exit tube 308 carrying infusion fluid to a patient.

As seen in FIG. 10, the flowmeter 200 also includes a backlight 202 that is used to illuminate the pendant drop 152 of infusion fluid, the optical imaging assembly 100, an image sensor 204 located at the image plane 106, a communication bus 212 at the output of the image sensor 204 carries image data to a digital processing device 206, which in turn is connected through a communication bus 220 to a memory element 208 which is used to store image data 216, other data 214, and processing instructions 210.

In operation, infusion fluid slowly leaves the fluid bag 312 and forms a pendant drop 152 within the drip chamber 300. Next, the backlight 202 is used to illuminate the pendant drop 152 through the sleeve 110 of the drip chamber 300. The light 203 that passes through the sleeve 110 is then collected by the optical imaging assembly 100 which then forms an image of the pendant drop 152 on the image sensor 204. The output of the image sensor 204 is pixelated image data in the form of a two-dimensional array of integer data, where the integer data corresponds to the brightness of the image at each location of the array. This digital array of brightness data is then transmitted over the communication bus 212 to the processor 206 that processes the image array data to 1) find the edge of the image of the pendant drop 152 within the array, and 2) compute the volume of the pendant drop 152 at the particular instant the image was captured by the image sensor 204. Knowing the precise time at which successive images are captured by the image sensor 204, and accurately computing the volume of the pendant drop 152 in each successive frame allows the time rate of change of the pendant drop 152 to be calculated, which is the rate of flow of the fluid.

It was mentioned earlier that a compact embodiment of the optical imaging assembly 100 is more desirable than an embodiment that is not compact. In some configurations, a more compact embodiment can be achieved by inserting a fold mirror into the assembly, such as between the third lens element 116 and the fourth lens element 120. Typically the fold mirror will be centered on the optical axis 102, and tilted at a 45° angle with respect to the optical axis 102 so the imaging path is bent 90°. This can reduce the width of the envelope that the optical imaging assembly 100 occupies by about 30%, although it will increase the size in an orthogonal direction. But this increase in size in an orthogonal direction generally will not increase the overall size of the flowmeter 200, because other flowmeter components in the orthogonal direction will constrain the size of the flowmeter 200 in this dimension.

The magnification was mentioned earlier in connection with FIG. 7A to be −0.526. The minus sign means that the image is inverted with respect to the object. Indeed, the apex of the pendant drop 152 in FIG. 3 is seen to be in the downward direction, while the image of the pendant drop in FIGS. 5 and 6 are seen to be in the upward direction. The magnitude of the magnification, 0.526 means that the size of the image is only 52.6% the size of the object, which is desirable because a smaller and less expensive image sensor 204 can be used as part of the flowmeter 200. The sign of the magnification of the optical imaging assembly 100 will generally be negative, although the magnitude of the magnification can be tailored to the size of the image sensor 204 and can be between 0.1 and 10.0.

The wavelength of light was mentioned earlier in connection with FIG. 7A to be 825 nm. The wavelength of the light used must be producible by the backlight 202, transmissible by all of the optical elements of the optical imaging assembly 100, transmissible by the sleeve 110, and the image sensor 204 must be responsive to it. The image sensor 204 is generally a silicon device, and is responsive to wavelengths between 400 nm and 1100 nm; the backlight can consist of one or more LED (light emitting diode) sources, which can emit light between 400 nm and 900 nm; and most refractive optical elements can transmit light in the visible and near IR spectral bands, including the wavelengths from 400 nm to 1100 nm. Therefore, the range of light wavelengths that can be used with the optical imaging assembly 100 can be from 400 nm to 900 nm.

As seen in FIG. 4, the center thickness of the fourth lens element 120 is rather thick, being 8.32 mm thick as prescribed in FIG. 7B. Polymer lens elements having a large thickness can be difficult to mold with good fidelity due to the large amount of shrinkage that the central portion of the lens element undergoes relative to the thinner outer portion as the lens cools after being molded. To remedy this, the fourth lens element 120 can be divided into two separate thinner lens elements. This has the disadvantage of increased material and assembly costs, but also provides two additional degrees of freedom that can be used to improve the image quality with the addition of the two surfaces of a fifth lens element.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An optical imaging assembly, comprising:
    a light-transmissive sleeve arranged on an optical axis and configured to enclose an object;
    a first refractive element arranged on the optical axis and having a first input surface and a first output surface, wherein one of the first input surface and the first output surface comprises a planar surface and the other of the first input surface and the first output surface comprises a cylindrical or acylindrical surface; and,
    a second refractive element arranged on the optical axis and having a second input surface and a second output surface, wherein one of the second input surface and the second output surface comprises a planar surface and the other of the second input surface and the second output surface comprises a cylindrical or acylindrical surface;
    wherein both said first and second refractive elements are arranged on the optical axis without any other intervening optical component such that said first and second output surfaces are configured to act in conjunction remove optical distortion generated by the object.

2. The optical imaging assembly as set forth in claim 1 further comprising:
    a third refractive element arranged on the optical axis and having a third input surface and a third output surface; and,
    a fourth refractive element arranged on the optical axis and having a fourth input surface and a fourth output surface,
    wherein the third refractive element is arranged between the second refractive element and the fourth refractive element.

3. The optical imaging assembly as set forth in claim 2 further comprising:
    an aperture stop disposed on the optical axis.

4. The optical imaging assembly as set forth in claim 3, wherein the aperture stop is arranged between said third and fourth refractive elements.

5. The optical imaging assembly as set forth in claim 3 further comprising an image plane arrange on the optical axis, and wherein the fourth refractive element is arranged on the optical axis between the third refractive element and the image plane.

6. The optical imaging assembly as set forth in claim 3 wherein the fourth refractive element comprises two lens elements.

7. The optical imaging assembly as set forth in claim 3 further comprising:
    an image plane arranged on the optical axis,
    wherein the third refractive element is arranged on the optical axis between the object plane and the aperture stop.

8. The optical imaging assembly as set forth in claim 3 wherein at least one of said third input and output surfaces have radial symmetry.

9. The optical imaging assembly as set forth in claim 8 wherein the at least one of said third input and output surfaces having radial symmetry is a spherical surface.

10. The optical imaging assembly as set forth in claim 8 wherein the at least one of said third input and output surfaces having radial symmetry is an aspherical surface.

11. The optical imaging assembly as set forth in claim 3 wherein both of said third input and output surfaces have radial symmetry.

12. The optical imaging assembly as set forth in claim 1 wherein the object comprises a liquid.

13. The optical imaging assembly as set forth in claim 12 wherein the liquid comprises a pendant drop.

14. The optical imaging assembly as set forth in claim 13 wherein the pendant drop is arranged symmetrically about an axis comprising an axis of rotation for the light-transmissive sleeve.

15. A flowmeter for a medial infusion device to measure a rate of flow of infused fluid, the flowmeter comprising:

a drip chamber arranged to receive an infused fluid and form pendent drops within a drip chamber defined by a sleeve;

a backlight arranged to illuminate the pendent drop;

an image assembly configured to collect light that passes out of the sleeve along an optical axis, wherein the image assembly comprises:

a first refractive element arranged on the optical axis and having a first input surface and a first output surface, wherein one of the first input surface and the first output surface comprises a planar surface and the other of the first input surface and the first output surface comprises a cylindrical or acylindrical surface; and, a second refractive element arranged on the optical axis and having a second input surface and a second output surface, wherein one of the second input surface and the second output surface comprises a planar surface and the other of the second input surface and the second output surface comprises a cylindrical or acylindrical surface;

wherein both said first and second refractive elements are arranged on the optical axis without any other intervening optical component.

* * * * *